United States Patent
Cage

[19]

[11] Patent Number: 5,297,063
[45] Date of Patent: Mar. 22, 1994

[54] METHOD FOR SELECTING CALIBRATION DATA FOR AN AUTO-CALIBRATING COMPASS

[75] Inventor: Russell E. Cage, Ann Arbor, Mich.

[73] Assignee: Chrysler Corporation, Highland Park, Mich.

[21] Appl. No.: 815,264

[22] Filed: Dec. 27, 1991

[51] Int. Cl.$^5$ .................... G01C 25/00; G01D 18/00
[52] U.S. Cl. .......................... 364/571.02; 364/571.01; 364/559; 33/356; 73/1 E
[58] Field of Search .............. 364/559, 571.01, 571.02, 364/571.03, 571.04, 571.05, 571.06, 571.07, 571.08; 73/1 E; 33/356

[56] References Cited

U.S. PATENT DOCUMENTS

| | | |
|---|---|---|
| 3,899,834 | 8/1975 | Harrison, Jr. |
| 3,975,621 | 8/1976 | Fowler .......................... 364/559 |
| 3,991,361 | 11/1976 | Mattern et al. |
| 4,179,741 | 12/1979 | Rossani ........................ 364/559 |
| 4,424,631 | 1/1984 | Franks . |
| 4,425,717 | 1/1984 | Marcus . |
| 4,497,034 | 1/1985 | Kuno et al. ................. 364/571.04 |
| 4,505,054 | 3/1985 | Clark et al. |
| 4,546,551 | 10/1985 | Franks . |
| 4,622,646 | 11/1986 | Waller et al. |
| 4,677,381 | 6/1987 | Geerlings . |
| 4,698,912 | 10/1987 | Fowler et al. |
| 4,797,841 | 1/1989 | Hatch ........................... 364/559 |
| 4,807,462 | 2/1989 | Al-Attar ....................... 364/559 |
| 5,046,031 | 9/1991 | Wanous ........................ 364/559 |
| 5,165,269 | 11/1992 | Nguyen ......................... 73/1 E |

FOREIGN PATENT DOCUMENTS

| | | |
|---|---|---|
| 0120691 | 10/1984 | European Pat. Off. |
| 60-135814 | 7/1985 | Japan . |
| 2056686 | 3/1981 | United Kingdom . |

Primary Examiner—Jack B. Harvey
Assistant Examiner—Jae H. Choi
Attorney, Agent, or Firm—Mark P. Calcaterra

[57] ABSTRACT

A method for selecting calibration data which uses mean square error to minimize variations in the calculated origins of the earth's magnetic field vector. A microcomputer having a memory calculates and stores the origin of the earth's magnetic field vector from the last three headings or data points. The x and y coordinates of the origins are summed with all the previous x and y coordinates and the mean square errors of the x and y coordinates are calculated. A figure of merit for the mean square errors is calculated. An adjusted origin is determined and stored by weighing the newly calculated origin by a figure of merit and adding it to the previous origin. Provision is made for reinitializing all quantities to zero when the sum of the mean square errors exceeds a predetermined maximum.

4 Claims, 4 Drawing Sheets

Point C is the midpoint between Point 1 and 2.
Point S is the midpoint between Point 2 and 3.

Automatic Calibration for Vehicle Compass

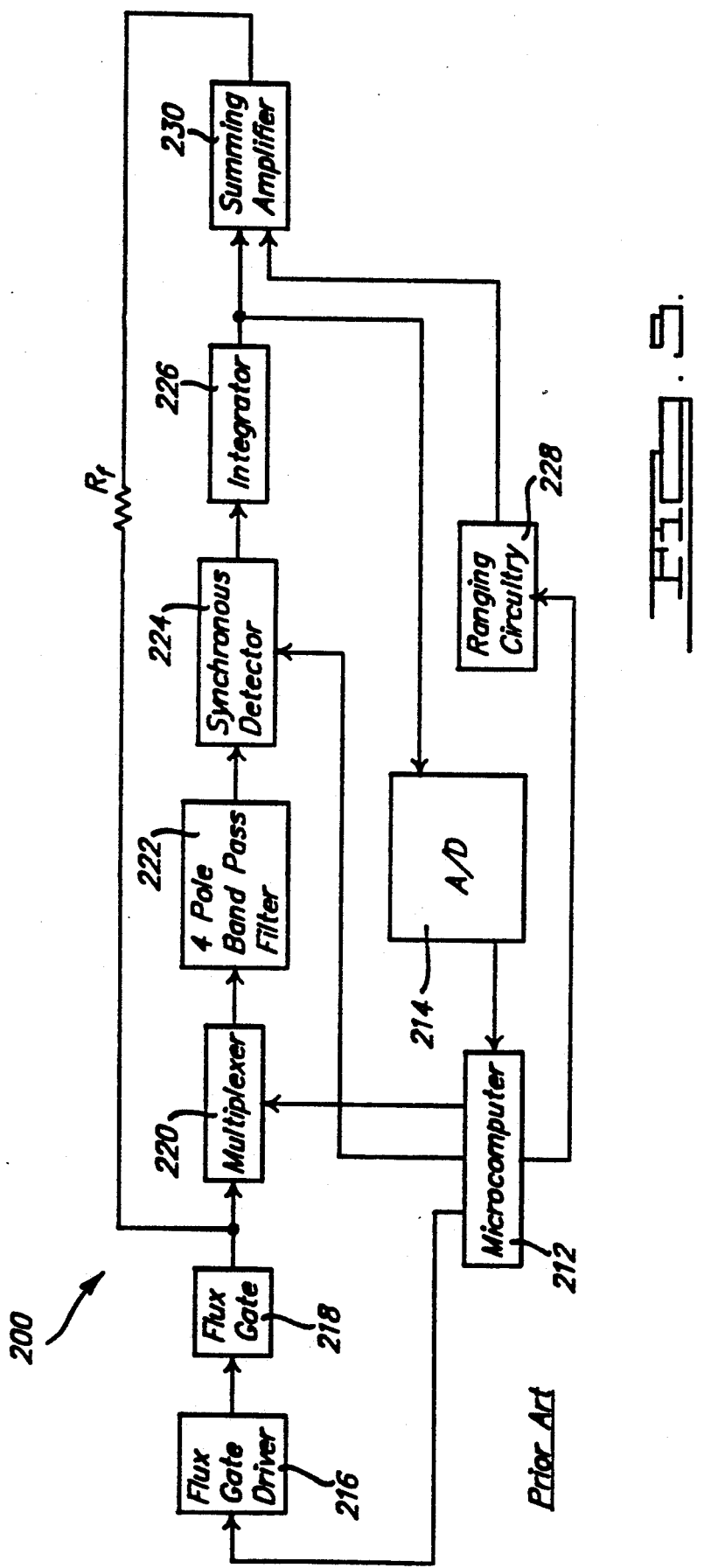

METHOD FOR SELECTING CALIBRATION DATA FOR AN AUTO-CALIBRATING COMPASS

CROSS-REFERENCE TO RELATED APPLICATIONS

The present application is related to the following, co-pending applications filed concurrently herewith:

"Scaling System And Method For An Electronic Compass", application Ser. No. 07/815,347, presently pending;

"Shifting System And Method For An Electronic Compass System", application Ser. No. 07/815,267, presently pending;

"Data Processing Method For An Electronic Compass System", application Ser. No. 07/815,266, presently pending;

"Heading Computation For An Electronic Compass", application Ser. No. 07/815,346, presently pending.

"Magnetic Transient Detection And Calibration Technique For An Auto-Calibrating Compass", application Ser. No. 07/815,268, presently pending;

"Flux-Gate Sensor Orientation Method", application Ser. No. 07/815,265, presently pending;

"Noise Removal Method For An Electronic Compass", application Ser. No. 07/815,269, presently pending;

"Flux-Gate Sensor Mounting And Method", application Ser. No. 07/815,270, presently pending.

"A Method For Interpreting Magnetic Direction For A Compass On A Vehicle", application Ser. No. 07/815,274, presently pending.

BACKGROUND OF THE INVENTION

1. Technical Field

The present invention relates to electronic compasses and more specifically to a method for selecting calibration data for an auto-calibrating electronic compass.

2. Discussion

Normally, electronic compass systems employ a microprocessor to calculate vehicle headings based upon signals received from a magnetic flux-gate sensor. An example of a microprocessor-based electronic compass can be found in U.S. Pat. No. 4,622,843 to Hormel, issued Nov. 18, 1986, entitled "Simplified Calibration Technique and Auto-Ranging Circuit for an Electronic Compass Control Circuit". This reference is hereby incorporated by reference.

The operation of the flux-gate sensors are also well-documented. See for example, "Magnetic Field Sensor and its Application to Automobiles" by Hisatsugu Itoh, dated February, 1980 and published by the Society of Automotive Engineers as Paper No. 800123; "Magnetic Heading Reference for the Electro/Fluidic Autopilot", by Doug Garner which appeared in two parts, one in the November, 1981 and one in the December, 1981 issues of *Sport Aviation*. The above-mentioned publications are also hereby incorporated by reference.

The subject invention is closely related to and is an improvement upon the method described in commonly assigned U.S. Pat. No. 4,807,462 to Al-Attar issued Feb. 28, 1989 entitled "Method for Performing Automatic Calibration in an Electronic Compass". This document is hereby incorporated by reference.

Auto-calibrating compasses suffer from real world problems. As discussed in the '462 patent to Al-Attar, auto-calibration occurs as a vehicle equipped with an auto-calibrating compass is driven. Since the calibration process does not occur at the same spot on the earth, it is subject to the effects of minor variations in the earth's magnetic field. Magnetic anomalies, caused by locally high concentrations of ferrous minerals, and magnetic transients, caused by time-variant magnetic fields, create noise in flux-gate sensor readings. It is desirable that the auto-calibration method minimize the effects of the noise.

A method for calculating the vector for the noise caused by magnetic anomalies and transients is disclosed in German Patent No. DE 3644681 A1, issued Jul. 14, 1988, to Helldorfer. A microprocessor is used to calculate the difference between a magnetic field vector sensed by the compass sensor and a previous magnetic field vector for the same heading. The resultant vector is then weighted by a factor $k<1$, which suppresses the effect of the anomalies and transients upon the direction of the vehicle.

SUMMARY OF THE INVENTION

In accordance with the preferred embodiments of the present invention, a method for selecting calibration data for an electronic compass system is provided. The method uses mean square error to minimize variations in the calculated origins of the earth's magnetic field vector. The method is implemented by initializing all quantities to zero. A microcomputer of an electronic compass system incorporating a flux-gate sensor calculates the origin of the earth's magnetic field vector from the last three headings or data points. The x and y coordinates of the origins are summed with all the previous x and y coordinates and the mean square errors of the x and y coordinates are calculated. A figure of merit for the mean square errors is then calculated. An adjusted origin is determined by weighing the newly calculated origin by a figure of merit and adding it to the previous origin. Provision is made for reinitializing all quantities to zero when the sum of the mean square errors exceeds a predetermined maximum.

BRIEF DESCRIPTION OF THE DRAWINGS

Other objects and advantages of the present invention will become apparent upon reading the following detailed description and upon reference to the following drawings in which:

FIG. 5 is a block diagram of the electronic compass system of the '843 patent to Hormel.

DETAILED DESCRIPTION OF THE PREFERRED EMBODIMENT

Figure 1:
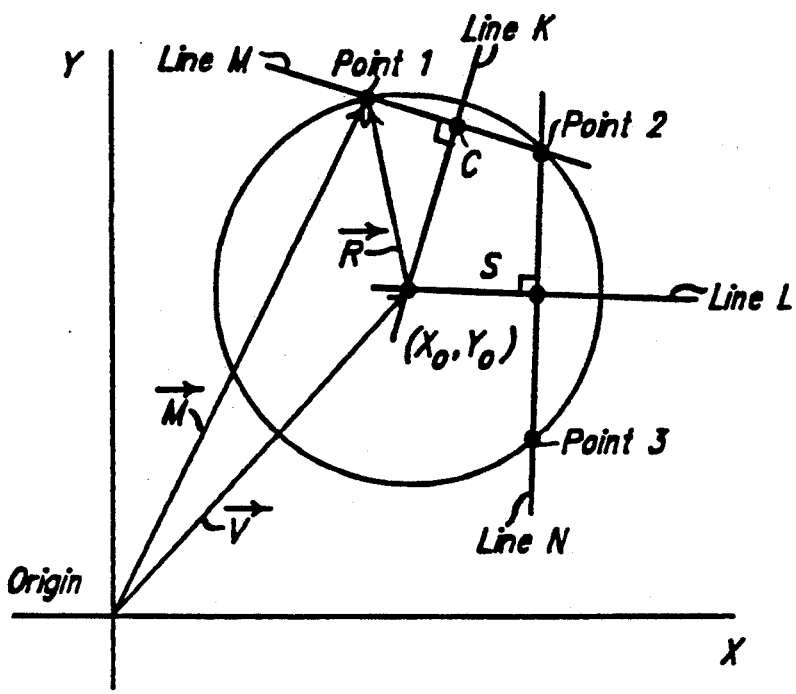
FIG. 1 shows cartesian axes x and y for measuring the magnetic field sensed by the sense coils of a flux-gate sensor. Also shown is the earth's field circle with its center $(x_o, y_o)$. The vector $\vec{R}$ represents the earth's magnetic field, the vector $\vec{V}$ represents the vehicle's magnetic field, and the vector $\vec{M}$ represents the magnetic field as sensed by the sense coils. Also shown are two chords M and N, and the perpendicular bisectors of each chord, K and L.

Referring to FIG. 1, the cartesian axes x and y measure the magnetic field strength in the two sense coils of a flux-gate sensor. Since the flux-gate sensor is stationary with respect to the vehicle, the coordinate axes correspond to the frame of reference of the vehicle. The origin represents a sensed magnetic field strength in each coil of zero.

The earth's magnetic field circle and its center are represented by cartesian coordinates $(x_o, y_o)$. The radius corresponds to the magnetic field vector $\bar{R}$ of the earth. As seen from the frame of reference of the vehicle, the direction of the earth's magnetic field vector $\bar{R}$ appears to change direction as the vehicle changes direction, thereby describing a circle. The sense coils of the flux-gate sensor sense the vector $\bar{M}$, which is the vector sum of the vehicle and earth magnetic fields, $\bar{V}$ and $\bar{R}$.

Points 1, 2 and 3 are three location points as read by the electronic compass as the vehicle moves about its journey. The 3 data points are taken according to a criterion of minimum distance. Each data point must be at least 32 analog-to-digital converter (A/D) counts away from each of the others to qualify. The actual calculation is done using the preferred formula:

$$(\text{Delta}X^2 + \text{Delta}Y^2) > 1024\ (32^2)$$

The constant 1024 is somewhat arbitrary; it was chosen to permit calibration with the minimum specified magnetic field strength (which sets an upper bound on the value) and minimize the effects of quantization error on the calibration (which sets a lower bound). Both of these numbers depend on the sensitivity of the compass hardware. In practice, the highest feasible value is used to gain accuracy.

As the vehicle turns direction, a new point is measured and captured through the use of the electronic compass. These three points are utilized in the auto-calibration procedure described in the '462 patent to Al-Attar.

Once the three points have been captured in the memory of the electronic compass system, two chord lines M and N are generated. Line M is formed by point 1 and point 2 on the circumference of the earth's field circle and line N is defined by points 2 and 3. A perpendicular bisector of each chord is defined. Perpendicular bisectors are represented as line K and line L, line K perpendicularly bisecting line M at a midpoint "C" between points 1 and 2, and line L perpendicularly bisecting line N at a midpoint "S" between points 2 and 3. Since the perpendicular bisector of a chord of a circle intersects other perpendicular bisectors of other chords of the same circle at the center of the circle, the center of the circle $(x_o, y_o)$ can be defined by the line K and line L. The point $(x_o, y_o)$ also represents the origin of the earth's magnetic field vector $\bar{R}$.

The vector $\bar{V}$ represents the magnetic field of the vehicle. The magnitude and direction of this vector does not change with respect to the frame of reference of the vehicle. Calibration is necessary to separate the vehicle's magnetic field from that of the earth's magnetic field so that the earth's magnetic field can be measured and used to give vehicle direction. Calibration can only be performed when the center $(x_o, y_o)$ is known since this point determines the tip, and therefore the magnitude and direction of the vector $\bar{V}$.

Figure 2:
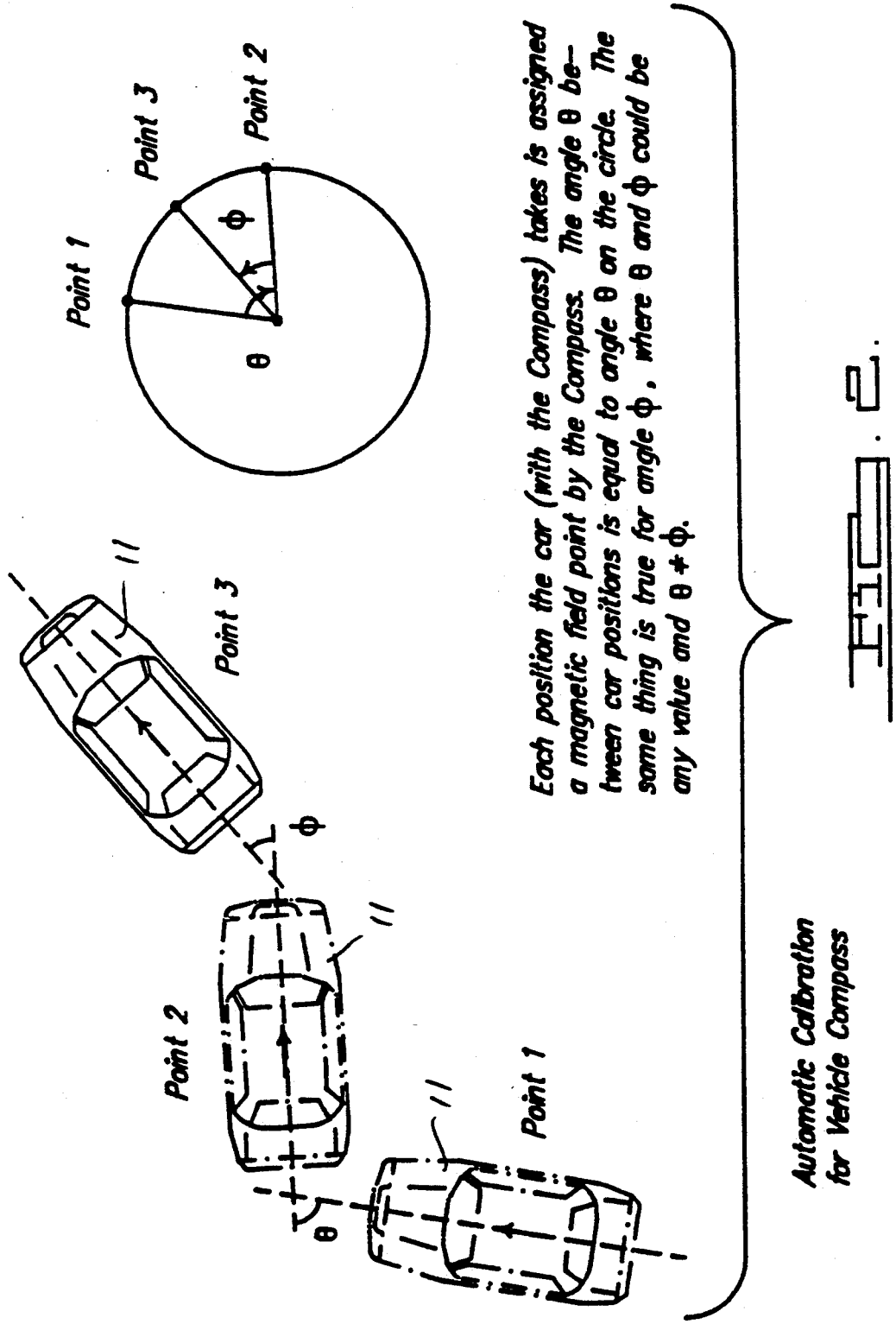
FIG. 2 illustrates vehicle movement typical of that observed during automatic calibration of a vehicle's electronic compass.

FIG. 2 illustrates how points 1, 2 and 3 are determined. In the ideal case (where the external magnetic field is of uniform strength and direction), for each position (i.e., vehicle heading) of the car, there is a different magnetic field vector $\bar{M}$ sensed by the electronic compass. As the vehicle turns, the tip of the vector $\bar{M}$ describes a set of points, which lie on a circle. The relative distance along the circumference of the circle is determined by the angular difference between the first heading and the second heading. In FIG. 2, this is illustrated for the first turn by the angle $\Theta$. When the vehicle makes another heading change, a third point is assigned. The relative distance along the circumference of the earth's field circle between the third point and the second point is measured by the angle $\phi$. Note that the direction the vehicle takes is unimportant for the calibration. Accordingly, points 1, 2 and 3 on the drawing of the circle correspond to the position of the car 11 at points 1, 2 and 3 of its travel.

Figure 3:
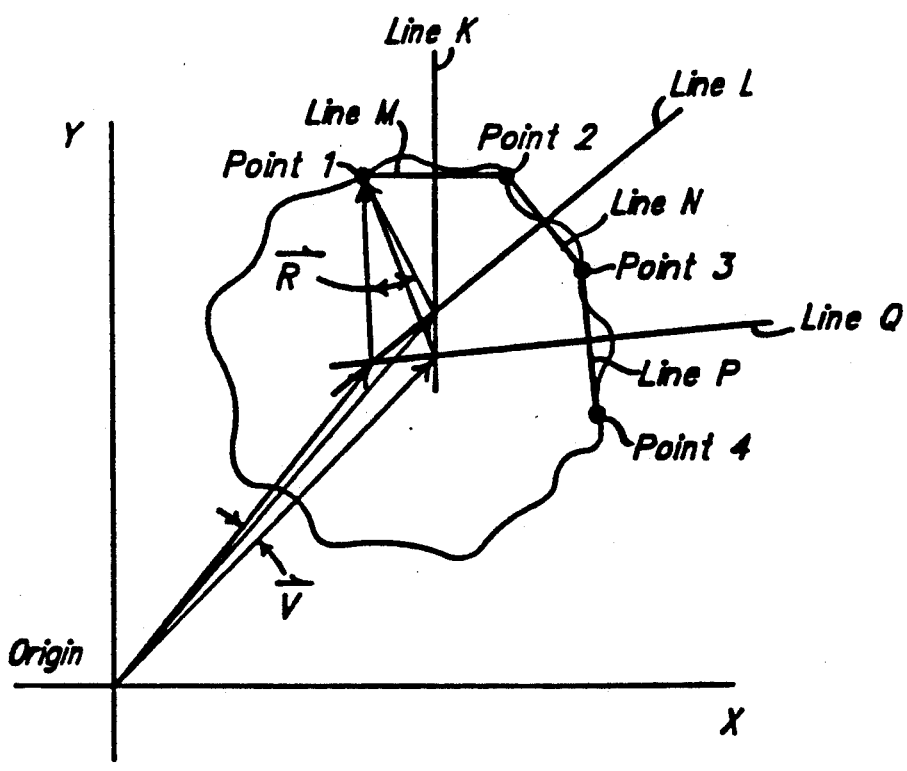
FIG. 3 shows the coordinate axes of FIG. 1, and an earth's field circle perturbed by noise.

As shown in FIG. 3, the real-world locus of points described by the earth's magnetic field vector $\bar{R}$ is not a true circle. When magnetic anomalies and transients are present, the earth's field circle becomes irregular, thereby introducing variability into the calculated values of the origin of the earth's magnetic field vector $\bar{R}$. Without an accurate solution for the origin of the earth's magnetic field vector $\bar{R}$, the vector $\bar{V}$ cannot be accurately determined.

Four points 1–4 have been used to determine the origin of the earth's magnetic field vector $\bar{R}$. Chord lines M, N and P are bisected by perpendicular bisectors K, L and Q. Due to the irregularities in the magnitude of the earth's magnetic field vector $\bar{R}$, perpendicular bisectors K, L and Q do not intersect at a common point. Since the origin of the earth's magnetic field vector $\bar{R}$ cannot be determined, the exact magnitude and direction of the vehicle's magnetic field vector $\bar{V}$ also cannot be determined accurately.

Figure 4:
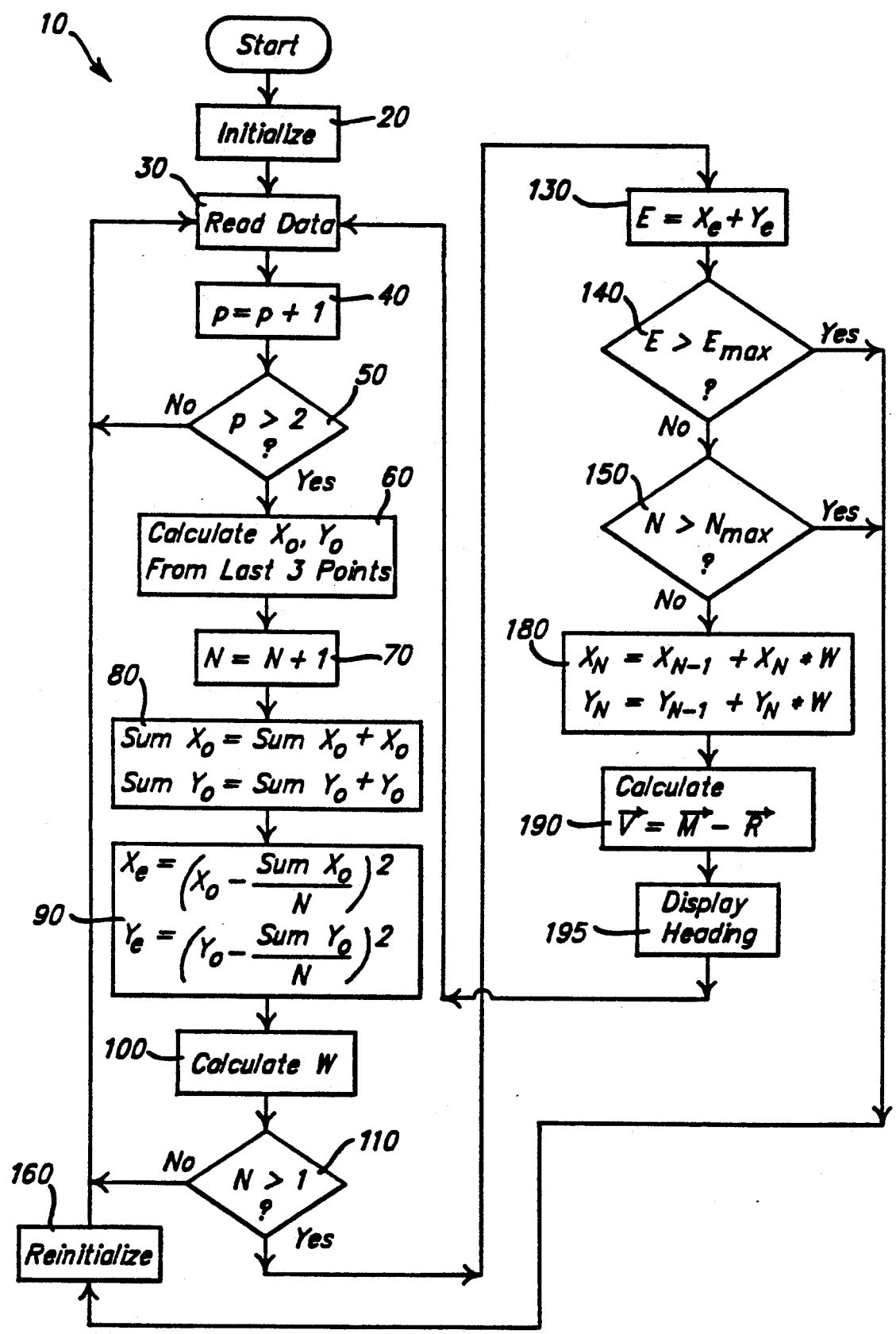
FIG. 4 is a flowchart of the method of selecting calibration data using statistical level of confidence measures.

The method of the present invention uses mean square error in the computation of the origin $(X_o, y_o)$ of the earth's magnetic field vector $\bar{R}$ as a measure of confidence in the reliability of the incoming data points. The method is illustrated in FIG. 4 and begins by initializing, in block 20, all quantities to zero. In block 30, a point along the locus described by the earth's magnetic field vector $\bar{R}$ is then taken. The routine 10 counts the number of points read, in block 40. If the number of points read is not greater than 2, than the routine 10 proceeds from block 50 back to block 30 until 3 points are read. Three points are necessary to produce 2 perpendicular bisectors whose intersection can be calculated in block 60.

The number of times the origin of the earth's magnetic field vector $\bar{R}$ is calculated is recorded by the count N in block 70, thus the coordinates $X_N$ and $y_N$ refer to the $N^{th}$ calculated center. Once a center reading has been calculated, it is summed with previous readings in block 80 and the mean square errors of the x and y values, $X_e$ and $Y_e$, are then calculated in block 90.

The weight W is a figure of merit to be assigned to the most recently calculated center and is a function of N and is calculated in block 100. In a preferred embodiment, the weight W applied to the new center is a function of the count N, as follows:

If N = 1,   W = 0
If N = 2,   W = 1     (if compass is uncalibrated)

-continued

| | | |
|---|---|---|
| If N = 2, | W = 1/64 | (if compass is calibrated) |
| If N = 3, | W = 1/16 | |
| If N = 4, | W = 1/4 | |
| If N = 5, | W = 1 | |

The method of calculating W is arbitrarily chosen for its small memory capacity requirements.

For a count N equal to 1, the mean square errors are equal to zero; therefore, a second center must be calculated in order to generate non-zero values for the mean square errors. The routine proceeds from block 110 back to block 30.

If the count N is 2 or greater, the error sum E is calculated in block 130. It represents the sum of the squares of the distance of the data points from the mean, thus taking into account errors along both the x and y axes. As shown in blocks 140 and 150, if the error sum E exceeds a maximum limit, which in the preferred embodiment is 100, or if the count N exceeds a maximum limit, which in the preferred embodiment is 5, all quantities are reinitialized in block 160 and the routine returns to block 30.

The magnitudes of the predetermined maxima for the count N and error sum E differ for the following reasons. The count N is reinitialized at 5 because the algorithm for calculating the weight W fails for higher values. The error sum E is re-initialized at 100 because this number was empirically found to yield calibrations of acceptable accuracy (which higher limits did not) and lower limits rejected too much data of acceptable quality. Alternatively, the method of the present invention could easily reinitialize the counters and sums based on more complex criteria, but does not simply for lack of space.

In an alternative preferred embodiment, the limit is a portion of the square of the calculated external magnetic field, which fixes the uncertainty to a given angular (heading) error rather than a given absolute error in the position of the calculated center. This limit gives improved calibration behavior in strong fields but requires more memory capacity.

If the limits are not exceeded, a new origin for the earth's magnetic field vector $\bar{R}$ is calculated in block 180. The most recently calculated coordinates $X_N$ and $y_N$ are weighted by the figure of merit W and added to the previous center coordinates $X_{N-1}$, $Y_{N-1}$.

In block 190 vehicle heading is calculated using the calibration method disclosed in the '462 patent. The vehicle's magnetic field vector $\bar{V}$ is calculated and subtracted from the magnetic field vector $\bar{M}$ sensed by the flux-gate sensor to yield the earth's magnetic field vector $\bar{R}$. In block 195, the angle associated with the earth's magnetic field vector $\bar{R}$ is displayed, and the routine returns to block 30 to calculate a new heading.

Turning now to FIG. 5, there is shown a block diagram of an electronic compass system 200 as represented in the '843 patent to Hormel, which is capable of using the method of the present invention. The heart of the system is a microcomputer 212 which employs an 8-bit analog-to-digital converter 214. The microcomputer 212 controls operation of the electronic compass system 200, beginning with a flux-gate driver 216. Upon receipt of a square-wave signal from the microcomputer 212, the flux-gate driver 216 adds enough drive to the signal to saturate a flux-gate 218. The operation of the flux-gate driver 216 and flux-gate 218 are explained in the documents incorporated by reference, namely "A Magnetic Heading Reference for the Electro/Fluidic Autopilot" and "Magnetic Field Sensor and its Application to Automobiles, (SAE Paper No. 800123)". The flux-gate 218 employs two sense coils oriented perpendicularly to one another. Voltages are induced across the sensor coils by the presence of the magnetic fields of the vehicle and the earth.

The voltages from the sense coils of the flux-gate 218 are processed by a multiplexer 220. The multiplexer 220 is in communication with the microcomputer 212, which generates a signal for controlling a network for switching use of a four-pole bandpass filter 222, a synchronous detector 224 and an integrator 226 periodically from one sense coil to the other. The multiplexer 220 is in communication with the four-pole bandpass filter 222, which filters out all but the second harmonic signals, whose amplitude is proportional to the earth's magnetic field.

Second harmonic signals are presented to the synchronous detector 224. The function of the synchronous detector 224 is to select the portion of the filtered signals to be integrated by the integrator 226. The output of the synchronous detector 224 is a half-wave rectified signal which is fed into the integrator 226.

The output of the integrator 226 periodically switches back and forth between two DC levels corresponding to the two sense coils of the flux-gate 218. Integrator output is stabilized by feeding back a current through resistor $R_f$ to the sense coils of the flux-gate 218. The feedback current eventually becomes an equal and opposite signal versus that produced by the magnetic field sensed by the flux-gate 218.

Heading information is determined from the output of the integrator 226. The microcomputer 212 is coupled to the integrator output through the 8-bit analog-to-digital converter 214. The 8-bit analog-to-digital converter 214 converts the DC levels to digital coordinates referenced to a cartesian coordinate system. The microcomputer 212 divides the y-coordinate, corresponding to the DC level from one coil, by the x-coordinate, corresponding to the other coil, and takes the arctangent of the quotient using a piece-wise-linear-function-of-x routine to yield the vehicle's heading.

Armed with the foregoing detailed description of the sequence of operations carried out by the preferred embodiments of the present invention, those of ordinary skill in the art will readily be able to write their own suitable software to operate a microcomputer-based electronic compass system in accordance with the teachings herein. Accordingly, the details of such software need not be described here. The software may be written in any suitable language, such as a lower-level language like assembly language, or a higher-level language such as "C". Similarly, virtually all of the digital aspects of the control circuitry for an electronic compass system of the present invention may be implemented with any suitable general-purpose microcomputer with off-chip or on-chip A/D capability, or may be implemented in an application-specific integrated circuit custom-designed for handling the required processing activities. Armed with the teachings of the present invention disclosed herein, those of the ordinary skill in the art are well-equipped to implement the present invention in any suitable combination of the digital and/or analog circuits. Accordingly, further details of such hardware need not be described here.

What is claimed is:

1. A method for determining heading from an origin of the earth's magnetic field vector in an auto-calibrating electronic compass comprising the steps of:
   (a) orienting first and second sense coils of a flux-gate sensor perpendicular to each other in the earth's magnetic field;
   (b) saturating said sense coils with a drive signal;
   (c) measuring an induced voltage in said sense coils induced by said magnetic field;
   (d) measuring and storing, in a memory unit connected to a processing unit, at least three heading data points related to said induced voltage, each said heading data point having an x and a y coordinate, each said heading data point being measured and stored after the orientation of the flux-gate sensor with respect to the earth's magnetic field vector, as measured at the flux-gate sensor, has changed;
   (e) calculating and storing x and y coordinates for an earth's magnetic field circle center;
   (f) adding said center coordinates to a sum of previous center coordinates;
   (g) calculating mean square errors of said center and said previous center coordinates;
   (h) calculating a figure of merit associated with the accuracy of said center coordinates;
   (i) calculating and storing x and y coordinates for a new center for said earth's magnetic field circle by adding to one of said previous center coordinate, said center coordinates calculated in step (b) as weighted by said figure of merit;
   (j) subtracting said new center coordinates from said stored heading data points to yield compensated heading data points having a compensated y coordinate and a compensated x coordinate;
   (k) dividing the compensated y coordinate by the compensated x coordinate to obtain a quotient, and calculating the arctangent of said quotient; and
   (l) using said calculated arctangent of said quotient to obtain a new vehicle heading for conveying information regarding true heading to a display unit.

2. The method of claim 1 further comprising:
   (k) reinitializing said center coordinates and said sum of said previous center coordinates when a sum of previous mean square errors exceeds a predetermined maximum.

3. The method of claim 2 wherein said predetermined maximum is proportional to the square of the magnitude of the earth's magnetic field as measured at said flux-gate sensor.

4. The method of claim 1, wherein said figure of merit is based on the number of times, N, that said center coordinates have been calculated.

* * * * *